United States Patent [19]

Newman

[11] Patent Number: 4,668,180
[45] Date of Patent: May 26, 1987

[54] CERAMIC BURNER HAVING HIGH TURNDOWN RATIO

[76] Inventor: Ray L. Newman, Hillcrest Dr., R.D. #1, Towanda, Pa. 18848

[21] Appl. No.: 708,631

[22] Filed: Mar. 6, 1985

Related U.S. Application Data

[62] Division of Ser. No. 444,104, Nov. 24, 1982.

[51] Int. Cl.⁴ .............................................. F23D 14/00
[52] U.S. Cl. .................................... 431/187; 431/215; 239/424; 239/434.5
[58] Field of Search ................ 431/187, 215; 264/274, 264/255; 239/591, 424, 434.5

[56] References Cited

U.S. PATENT DOCUMENTS

| | | | |
|---|---|---|---|
| 1,313,360 | 8/1919 | Wendell et al. | 431/187 |
| 2,571,336 | 10/1951 | Buckholdt | 431/187 |
| 3,568,932 | 3/1971 | Van Laar et al. | 431/187 X |
| 3,695,816 | 10/1972 | Oeppen et al. | 431/166 |
| 3,861,858 | 1/1975 | Hemsath et al. | 431/353 |
| 4,304,549 | 12/1981 | Pfau | 431/215 |
| 4,354,495 | 10/1982 | Bodicky | 128/348 |
| 4,363,623 | 12/1982 | Brune | 432/219 |

FOREIGN PATENT DOCUMENTS 462195  1/1950  Canada ................ 431/164

*Primary Examiner*—Samuel Scott
*Assistant Examiner*—Allen J. Flanigan

[57] ABSTRACT

A gas burner comprises a ceramic tube through which a gaseous fuel flows, a chamber surrounding the ceramic tube, and means for delivering preheated combustion air to the chamber. There is a venturi around the tip of the ceramic tube, angled with respect to the tube, through which the preheated combustion air flows. The venturi enhances mixing of the air with the gaseous fuel forward of the tip of the ceramic tube.

1 Claim, 1 Drawing Figure

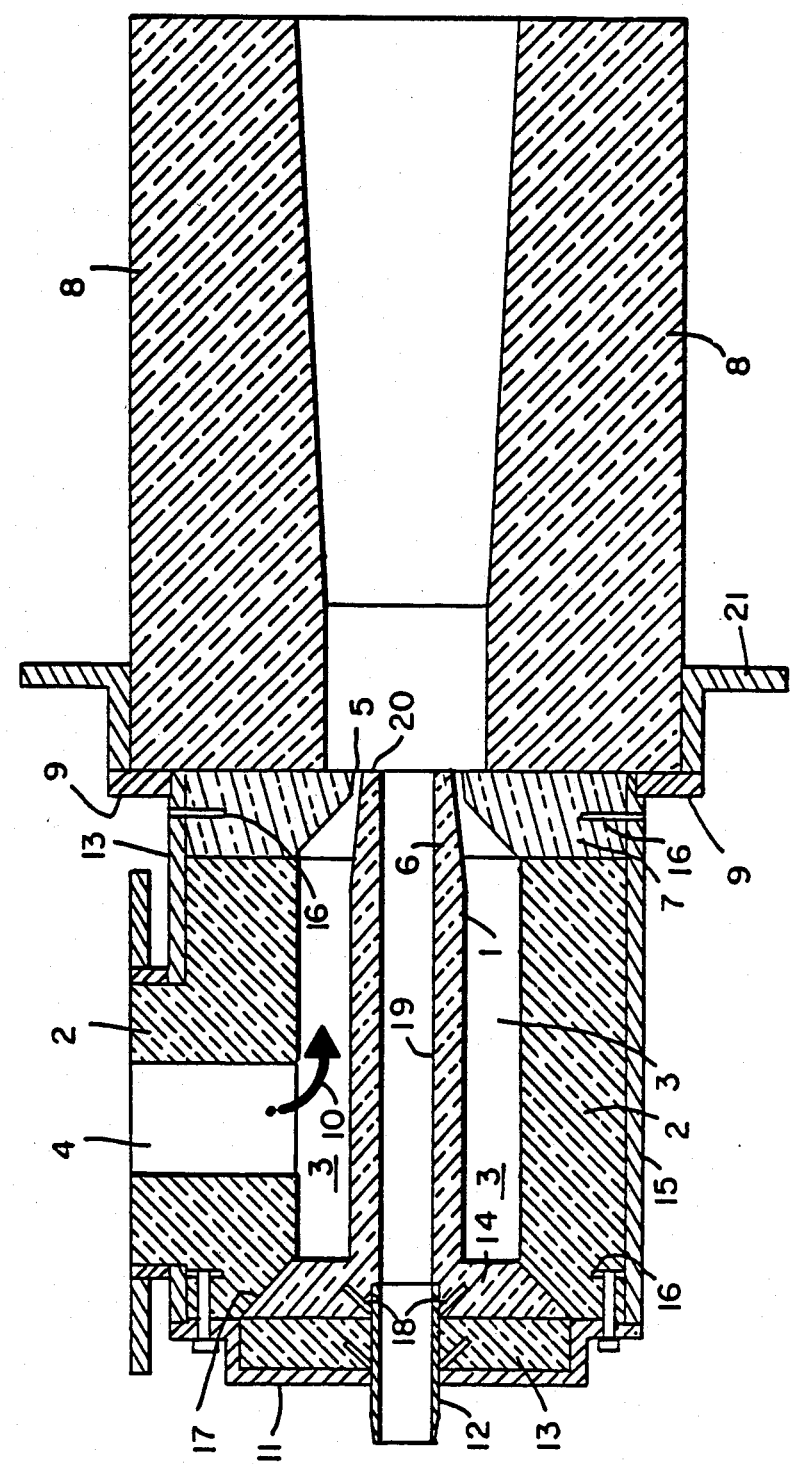

CERAMIC BURNER HAVING HIGH TURNDOWN RATIO

This application is a division of application Ser. No. 444,104, filed Nov. 24, 1982.

This invention concerns gas burners. It particularly relates to such burners that are used in conjunction with heat recuperators, for example, ceramic cross-flow recuperators such as are shown in U.S. Pat. Nos. 4,083,400, 4,130,160, 4,279,297 and 4,300,627. The use of such recuperators is becoming more widespread because they conserve energy. Such recuperators preheat combustion air before the air is delivered to a burner where the air is mixed with gaseous fuel prior to combustion of the fuel. As the efficiency of such recuperators is continually improving, the temperatures to which the combustion air is heated has been increasing. This results in a problem in conventional burners where the combustion air is introduced around the gas inlet tube or nozzle at a point or region in back of the nozzle tip. The hot combustion air can heat the gas, before combustion, to a temperature high enough to crack the gas, that is to say, to break the gas down into constituents that will not burn completely. For example, some of the methane component of natural gas could be broken down into carbon and hydrogen, with the result that the carbon does not burn completely. In such a case, not only is there inefficient combustion, but the burner can soot up rapidly, necessitating frequent cleanings. The cracking temperature of one gaseous fuel, namely, natural gas, is about 900° F.

My invention solves the problem by making the gas inlet tube or nozzle of an insulating ceramic that prevents the gas passing therethrough from being heated to its cracking temperature by the surrounding preheated combustion air even when the temperature of the surrounding preheated combustion air exceeds, substantially, the cracking temperature of the gas. Moreover, the design of the ceramic burner is such that it will permit a high turndown ratio, about ten to one, during operation. Turndown ratio is the ratio of the maximum to minimum heat input rates with which the burner will operate satisfactorily.

The single FIGURE in the drawing is a sectional view of a ceramic burner in accordance with this invention.

As shown in the drawing, a ceramic burner in accordance with this invention comprises a gas inlet tube or nozzle 1 which is made of an insulating ceramic. Nozzle 1 is disposed within a ceramic body 2 providing a surrounding chamber 3 around nozzle 1. A hole 4 through ceramic body 2 is the inlet for preheated combustion air which enters chamber 3 and follows the path of arrow 10. The air flows forward through a venturi 5 formed between the forward end 6 of nozzle 1, which is tapered, and the forward section 7 of ceramic body 2, which is also tapered. Mixing of the gas and air occurs just forward of venturi 5 within ceramic tile 8 where combustion takes place. Ceramic combustion chambers similar to ceramic tile 8 are shown in U.S. Pat. Nos. 4,144,020, 4,060,380 and 3,676,048 where they are also called burner blocks.

In one embodiment, ceramic tile 8 was 13½ inches long by 10 inches square and the hole therethrough was 3 inches diameter at the nozzle end, tapering to 4 inches diameter at the other end. Ceramic tile 8 was made by casting Alundum Castable Cement CA 334 (Norton Co., Worcester, Mass.) in a suitable mold; the mold was removed after setting, of course. Four anchor bolts (not shown) were embedded in the casting for securing it to metal base 9.

Nozzle 1 was made by casting Kaolite 2200, a silica-alumina-calcia insulating casting cement made by Babcock & Wilcox Co., Augusta, Ga., within metal end cap 11, the casting being designated in the drawing as casting 13. End cap 11 had a short threaded metal pipe 12 fastened thereto and protruding therethrough. Several short metal rods 18 were welded to pipe 12 and protruded angularly into casting 13 to secure the casting. The remainder of nozzle 1 was then made by casting Alundum Insulating Castable Cement CA 333 on top of casting 13, this second casting being designated as casting 14, the desired shape of the nozzle being obtained by the use of a suitable mold with a removable cylindrical rod to form the hole through the nozzle. Metal pipe 12, with additional metal rods 18, protruded into casting 14. In this example, casting 13 had a diameter of 6⅛ inches and a thickness of 1 inch. The overall length of nozzle 1 was 10¾ inches and the wall thickness thereof was ⅞ inch at a point 1 inch from casting 13, tapering to a wall thickness of ⅝ inch at a point 7½ inches from casting 13. At tip 20 of nozzle 1, the wall thickness was ⅛ inch.

Ceramic body 2 was also made of a castable cement, forward section 7 thereof being cast of CA 333 and the remainder being cast of Kaolite 2200. Ceramic body 2 was cast within metal shell 15 from which metal pins 16, welded thereto, protruded into the casting to secure it to metal shell 15. The outer diameter of ceramic body 2 was 8 inches and its inner diameter, excluding forward end 8, was 4⅛ inches. The overall length of ceramic body 2 was 9¾ inches. The inner diameter of forward end 7 was angled about 45°, as shown in the drawing, and then tapered to provide venturi 5 between it and tapered forward end 6 of nozzle 1. At the rear, the inner diameter of ceramic body 2 was also angled about 45° in order to mate with similarly angled surface 17 of casting 14 of nozzle 1. The diameter of hole 4 was 2 inches.

Kaolite 2200 and CA 333 are both insulating ceramics. Kaolite 2200 is a more efficient insulator, but can only be used at temperatures up to about 2200° F., while CA 333 can be used at temperatures up to about 3300° F. For this reason, Kaolite 2200 is used to make casting 13, which is exposed to a low operating temperature, while CA 333 is used to make casting 14, which is exposed to a higher operating temperature.

In operation, the burner could be mounted on a furnace wall, with ceramic tile 8 protruding therethrough, by means of mounting plate 21.

For purposes of this invention, venturi 5 is angled slightly with respect to the axis of nozzle 1 so that the path of venturi 5 intersects the axis of nozzle 1 forward of tip 20. This ensures that the preheated air enters the gas stream and mixes therewith forward of tip 20. In one example, venturi 5 was angled 6½°.

To enhance mixing of the preheated air with the gas, it is also desirable that the cross sectional area of venturi 5 through which the preheated air flows be less than about four times the cross sectional area of nozzle 1 through which the gas flows. In one example, the inside diameter of nozzle 1 was 0.75 inches, so the cross sectional area of nozzle 1 through which the gas flows was 0.44 square inches. The outside diameter of nozzle 1 at tip 20 was 1.5 inches and the inside diameter of nozzle 1 at tip 20 was 1.5 inches and the inside diameter of forward section 7 thereat was 2.0 inches; thus the cross sectional area of venturi 5 at the tip end was 1.375 square inches and the ratio of said cross sectional area of venturi 5 to said cross sectional area of nozzle 1 was 3.12 to 1.

I claim:

1. A gas burner comprising a gas inlet tube comprising a tubular casting of a castable insulating ceramic material and having a tapered forward end; a ceramic body spaced from, and surrounding, the gas inlet tube, the space therebetween defining a chamber, the ceramic body having a tapered forward end; a hole in the ceramic body serving as an inlet for preheated combustion air into the chamber; the forward ends of the gas inlet tube and the ceramic body tapering in the same direction, the space between said tapered forward ends being an annular venturi, the path of the venturi intersecting the axis of the gas inlet tube forward of the gas inlet tube so that mixing of the preheated combustion air and the gas occurs forward of the gas inlet tube; the relationship between the cross sectional area of the venturi and the cross sectional area of the gas inlet tube through which the gas flows being such as to provide a high turndown ratio; said ceramic body having a tapered forward end which tapers at about 45° and then tapers more gradually to form in cooperation with said gas inlet tube the throat of said venturi; the cross sectional area of the venturi through which the preheated air flows being less than about four times the cross sectional area of the fuel gas outlet area.

* * * * *